US008924077B2

(12) United States Patent
Yamada et al.

(10) Patent No.: US 8,924,077 B2
(45) Date of Patent: Dec. 30, 2014

(54) DRIVE ASSISTANCE DEVICE

(75) Inventors: Yuki Yamada, Susono (JP); Takeshi Matsumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 565 days.

(21) Appl. No.: 12/671,569

(22) PCT Filed: Jul. 31, 2008

(86) PCT No.: PCT/JP2008/063766
§ 371 (c)(1), (2), (4) Date: Feb. 1, 2010

(87) PCT Pub. No.: WO2009/020044
PCT Pub. Date: Feb. 12, 2009

(65) Prior Publication Data

US 2011/0029195 A1 Feb. 3, 2011

(30) Foreign Application Priority Data

Aug. 6, 2007 (JP) ................................ 2007-204283

(51) Int. Cl.
*G01C 21/00* (2006.01)
*G08G 1/09* (2006.01)
*G08G 1/0967* (2006.01)

(52) U.S. Cl.
CPC .......... *G01C 21/00* (2013.01); *G08G 1/096725* (2013.01); *G08G 1/09675* (2013.01); *G08G 1/096783* (2013.01)
USPC ........................................................... 701/36

(58) Field of Classification Search
USPC ........................................................... 701/36
See application file for complete search history.

(56) References Cited

U.S. PATENT DOCUMENTS

2002/0105438 A1* 8/2002 Forbes et al. ................. 340/901
2005/0099279 A1* 5/2005 Forbes et al. ................. 340/435
2005/0134478 A1* 6/2005 Mese et al. .................... 340/901
2006/0235607 A1 10/2006 Nakashima
2006/0271286 A1* 11/2006 Rosenberg .................... 701/211
2008/0051997 A1* 2/2008 Rosenberg .................... 701/211
2009/0115638 A1* 5/2009 Shankwitz et al. ........... 340/988

FOREIGN PATENT DOCUMENTS

CN 1847794 A 10/2006
EP 1 607 924 A1 12/2005
JP 10002751 A * 1/1998 ............ G01C 21/00

(Continued)

OTHER PUBLICATIONS

International Search Report issued in International Application No. PCT/JP2008/063766; Mailed Sep. 2, 2008.

(Continued)

*Primary Examiner* — Shelley Chen
(74) *Attorney, Agent, or Firm* — Oliff PLC

(57) ABSTRACT

Disclosed is a drive assistance device capable of performing proper drive assistance by reducing unnecessary drive assistance operations. The drive assistance device performs drive assistance relative to stopping of a vehicle at an intersection. When the vehicle approaches the intersection where an arrow lamp device is installed at a traffic signal, if the necessity of drive assistance for stimulating a driver to stop at the signal according to lighting of the arrow lamp device differs depending on a route of the vehicle, the start timing of the drive assistance operation is delayed and drive assistance is executed. Therefore, an unnecessary drive assistance operation can be suppressed.

11 Claims, 13 Drawing Sheets

(56) References Cited

FOREIGN PATENT DOCUMENTS

| | | |
|---|---|---|
| JP | A-10-2751 | 1/1998 |
| JP | A-2004-252718 | 9/2004 |
| JP | A-2005-247265 | 9/2005 |
| JP | A-2006-214945 | 8/2006 |
| JP | A-2006-285732 | 10/2006 |
| JP | A-2007-192619 | 8/2007 |
| JP | 2007271550 A * | 10/2007 |
| JP | A-2007-271550 | 10/2007 |

OTHER PUBLICATIONS

International Preliminary Report on Patentability issued in International Application No. PCT/JP2008/063766, on Feb. 24, 2010.

Aug. 2, 2012 Search Report issued in European Patent Application No. 08791981.7.

* cited by examiner

DRIVE ASSISTANCE DEVICE

TECHNICAL FIELD

The present invention relates to a drive assistance device for assisting vehicle driving.

BACKGROUND ART

Japanese Unexamined Patent Application Publication No. 2004-252718 describes a drive assistance device for assisting vehicle driving. In this drive assistance device, a signal indicating the lighting state of a traffic signal is transmitted from a roadside device to an in-vehicle device, and when the in-vehicle device that receives the signal receives a signal indicating a red light lighting state, a notification operation is performed so as to stimulate a driver of the vehicle to stop the vehicle.

[Patent Document 1] Japanese Unexamined Patent Application Publication No. 2004-252718

DISCLOSURE OF THE INVENTION

Problem that the Invention is to Solve

However, in such a device, unnecessary drive assistance may be performed. For example, when an arrow display device is installed at a traffic signal at an intersection, and the arrow display device is being displayed, drive assistance for stimulating a driver to stop a vehicle is unnecessary for vehicles moving in the direction of arrow display. In this case, if unnecessary drive assistance is performed, the driver of the vehicle may feel annoyed.

Accordingly, the invention has been finalized in order to solve such a problem, and it is an object of the invention to provide a drive assistance device capable of performing proper drive assistance by reducing unnecessary drive assistance operations.

Means for Carrying Out the Invention

That is, a drive assistance device according to the invention is a drive assistance device for drive assistance of a vehicle at an intersection in which, when drive assistance differs depending on a route of the vehicle, a drive assistance operation is suppressed as compared with a case where the same drive assistance is performed regardless of the route of the vehicle.

With this configuration, when drive assistance differs depending on the route of the vehicle, a drive assistance operation is suppressed as compared with a case where the same drive assistance is performed regardless of the route of the vehicle, so unnecessary drive assistance operations can be reduced.

In the drive assistance device according to the invention, when drive assistance differs depending on the route of the vehicle, the start timing of the drive assistance operation may be delayed as compared with a case where the same drive assistance is performed regardless of the route of the vehicle.

In the drive assistance device according to the invention, when the necessity of stopping the vehicle differs depending on the route of the vehicle, the drive assistance operation may be suppressed as compared with a case where the necessity of stopping the vehicle does not differ.

With this configuration, when the necessity of stopping the vehicle at the intersection differs depending on the route of the vehicle, the drive assistance operation is suppressed as compared with a case where the necessity of stopping does not differ, so the drive assistance operation for unnecessarily stopping the vehicle can be minimized.

In the drive assistance device according to the invention, when the necessity of stopping differs depending on the route of the vehicle, the start timing of the drive assistance operation may be delayed as compared with a case where the necessity of stopping does not differ.

With this configuration, when the necessity of stopping differs depending on the route of the vehicle, the start timing of the drive assistance operation is delayed as compared with a case where the necessity of stopping does not differ, so the execution of unnecessary drive assistance operations can be suppressed, and necessary drive assistance operations can be executed so as to ensure the safety of vehicle driving.

In the drive assistance device according to the invention, the higher the route of the vehicle is likely to be a no-stop-required route, the more the drive assistance operation may be suppressed.

With this configuration, the higher the route of the vehicle is likely to be a no-stop-required route, the more the drive assistance operation is suppressed, so it is possible to properly prevent an unnecessary drive assistance operation from being performed.

In the drive assistance device according to the invention, it may be determined whether the route of the vehicle is likely to be a no-stop-required route or not on the basis of a travel behavior regarding the no-stop-required route.

With this configuration, it is determined whether the route of the vehicle is likely to be a no-stop-required route or not on the basis of a travel behavior regarding the no-stop-required route, so determination accuracy of whether the route of the vehicle is a no-stop-required route or not can be increased.

In the drive assistance device according to the invention, it may be determined whether the route of the vehicle is likely to be the no-stop-required route or not on the basis of the number of lanes of a road on which the vehicle is traveling and presence/absence of an exclusive lane on the no-stop-required route.

With this configuration, it is determined whether the route of the vehicle is likely to be the no-stop-required route or not on the basis of the number of lanes of the road on which the vehicle is traveling and presence/absence of the exclusive lane on the no-stop-required route, so determination accuracy of whether the route of the vehicle is the no-stop-required route or not can be increased.

In the drive assistance device according to the invention, when a preceding vehicle is present in front of the vehicle, it may be determined whether the route of the vehicle is likely to be the no-stop-required route or not on the basis of a comparison result of a vehicle speed after a travel behavior of the vehicle with a vehicle speed before the travel behavior of the vehicle.

With this configuration, when a preceding vehicle is present in front of the vehicle, it may be determined whether the route of the vehicle is likely to be the no-stop-required route or not on the basis of a comparison result of a vehicle speed after a travel behavior of the vehicle with a vehicle speed before the travel behavior of the vehicle. Therefore, it is possible to determine whether the travel behavior of the vehicle is a behavior for passing the preceding vehicle or a behavior for going to the no-stop-required route, so determination accuracy of whether the route of the vehicle is the no-stop-required route or not can be increased.

In the drive assistance device according to the invention, when an exclusive lane on a no-stop-required route at the intersection is added around the intersection, the drive assistance operation may be suppressed as compared with a case where no exclusive lane on the no-stop-required route is added.

With this configuration, when an exclusive lane on a no-stop-required route at the intersection is added around the intersection, the drive assistance operation is suppressed as compared with a case where no exclusive lane on the no-stop-required route is added. Therefore, it is possible to determine whether the drive assistance operation should be suppressed or not on the basis of whether the vehicle enters the exclusive lane on the no-stop-required route or not, so a proper drive assistance operation can be performed.

Advantage of the Invention

According to the invention, it is possible to provide a drive assistance device capable of performing proper drive assistance by reducing unnecessary drive assistance operations.

DESCRIPTION OF REFERENCE NUMERALS AND SIGNS

Figure 1:
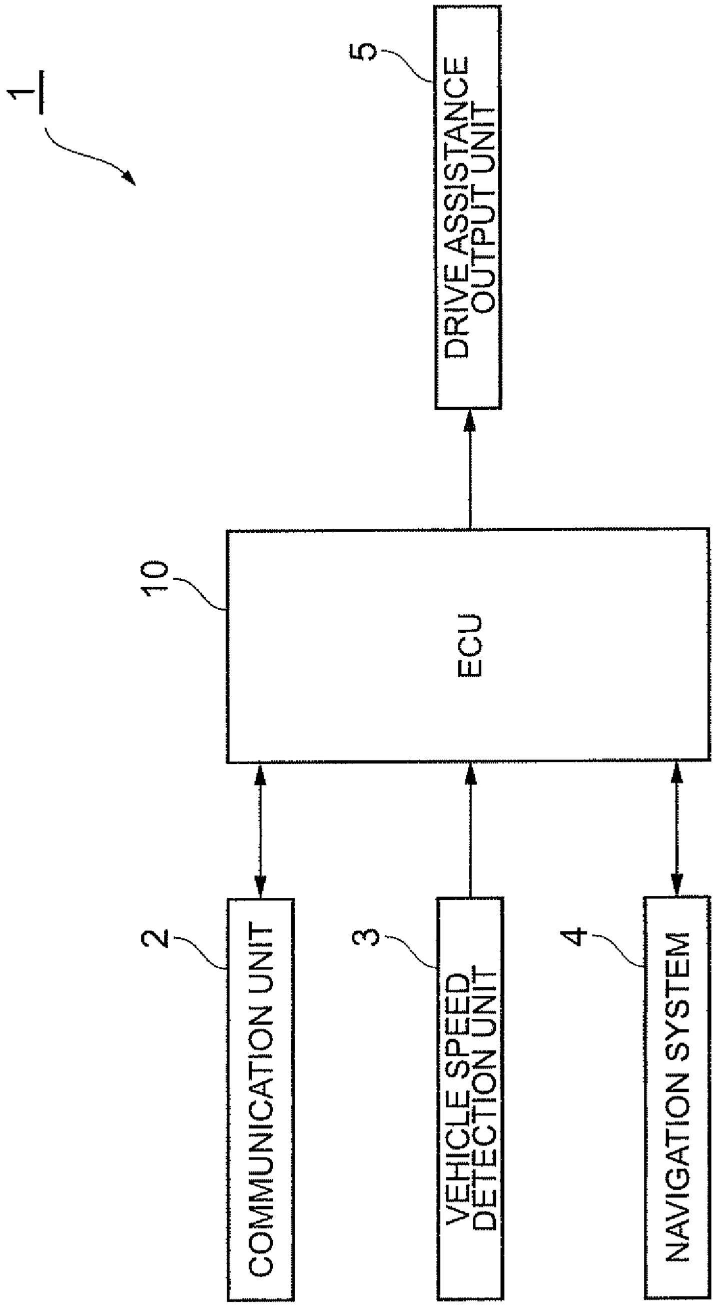
FIG. 1 is a diagram schematically showing the configuration of a drive assistance device according to an embodiment of the invention.

1: drive assistance device
2: communication unit
3: vehicle speed detection unit
4: navigation system
5: drive assistance output unit
10: ECU

BEST MODE FOR CARRYING OUT THE INVENTION

An embodiment of the invention will be described in detail with reference to the accompanying drawings. In the description of the drawings, the same parts are represented by the same reference numerals, and overlap description will be omitted.

FIG. 1 is a diagram schematically showing the configuration of a drive assistance device according to an embodiment.

A drive assistance device 1 of this embodiment is a device that is mounted in a vehicle so as to perform drive assistance of the vehicle at an intersection. For example, the drive assistance device 1 performs drive assistance on the basis of a display state of a traffic signal nearest to the vehicle in the vehicle travel direction. The term "intersection" means a place where roads cross each other, and includes a crossroad, a T-junction, an interchange, and the like.

As shown in FIG. 1, the drive assistance device 1 includes a communication unit 2, a vehicle speed detection unit 3, a navigation system 4, a drive assistance output unit 5, and an ECU 6. The communication unit 2 is communication means for acquiring traffic information or road information, such as traffic signal display information or the like. As the communication unit 2, for example, a unit capable of receiving a signal of an optical beacon is used.

The communication unit 2 performs communication with a roadside device installed at a road so as to acquire, for example, information regarding a display cycle of a traffic signal, information regarding the number of lanes of a road, information regarding presence/absence of right/left-turn-only lanes, information regarding a distance to a stop line at an intersection, information regarding a distance from a stop line to a center of a road, and information regarding a position of a vehicle at the time of communication. In this case, the communication unit 2 functions as signal state acquisition means for acquiring information regarding a display state of a traffic signal nearest to the vehicle. Information acquired by the communication unit 2 is input to the ECU 10 and stored in a memory.

The vehicle speed detection unit 3 detects the vehicle speed of the own vehicle in which the drive assistance device 1 is mounted. As the vehicle speed detection unit 3, for example, a wheel speed sensor is used. A detection signal of the vehicle speed detection unit 3 is input to the ECU 10 for every predetermined time and written as vehicle speed data.

The navigation system 4 functions as position detection means for detecting the position of the own vehicle in which the drive assistance device 1 is mounted, and also functions as traffic signal detection means for detecting the position of a traffic signal nearest to the vehicle from the position of the own vehicle. As the navigation system 4, for example, a device having an internal GPS (Global Positioning System) and a map database is used. The navigation system 4 can recognize the position of the own vehicle on map data on the basis of a detection signal of the GPS. The navigation system 4 inputs a position data signal to the ECU 10 for every predetermined time. In this case, position data of the vehicle and position data of the traffic signal are written in the ECU 10.

The drive assistance output unit 5 executes drive assistance when it is determined that drive assistance is required, and functions as, for example, alarm means for giving an alarm regarding traffic information to a driver, or braking control means for forcibly intervening in vehicle braking. Specifically, as the alarm means, a speaker, a buzzer, or the like which gives an audible alarm to the driver is used. Alternatively, as the alarm means, a liquid crystal display, a lamp, a monitor of the navigation system 4, or the like which performs visual notification to the driver may be used. In addition, as the alarm means, a device, such as the vibration of a handle, a driver seat, or the like, which performs tactile notification to the driver may be used.

As the braking control means of the drive assistance output unit 5, for example, an ECU for brake control is used. A braking instruction signal is output from the ECU 10 to the ECU for brake control, such that vehicle braking can be forcibly performed.

The ECU 10 controls the entire device and is composed of, for example, a computer including a CPU, a ROM, and a RAM. The ECU 10 is connected to the communication unit 2 to receive information received by the communication unit 2 and to output information of the own vehicle and the like to the communication unit 2. In this case, the ECU 10 functions as communication control means.

The ECU 10 functions as drive assistance means for determining whether drive assistance should be performed, and when it is determined that drive assistance should be performed, executing drive assistance. For example, if it is determined that a traffic signal installed at the intersection nearest to the vehicle performs red display when the vehicle passes through the intersection, the ECU 10 instructs the drive assistance output unit 5 to give an alarm that the traffic signal performs red display.

In this case, when the necessity of stopping the vehicle at the intersection differs depending on the route of the vehicle, the ECU 10 suppresses a drive assistance operation as compared with a case where the necessity of stopping the vehicle does not differ regardless of the route of the vehicle. For example, in the case of a traffic signal at the intersection of an arrow lamp device-equipped traffic signal in which green display is performed for right-turn-only, the arrow lamp device may be lit when the vehicle passes through the intersection. In this case, if the vehicle travels along a route indicated by the arrow lamp device, the traffic signal performs green display, and if the vehicle does not travel along a route indicated by the arrow lamp device, the traffic signal performs red display. In this case, the necessity of stopping the vehicle differs depending on the route of the vehicle, and the start timing of the drive assistance operation, such as a notification or an alarm indicating that red display is performed, is delayed. Thus, unnecessary drive assistance operations can be reduced.

Next, an operation of the drive assistance device of this embodiment will be described.

Figure 2:
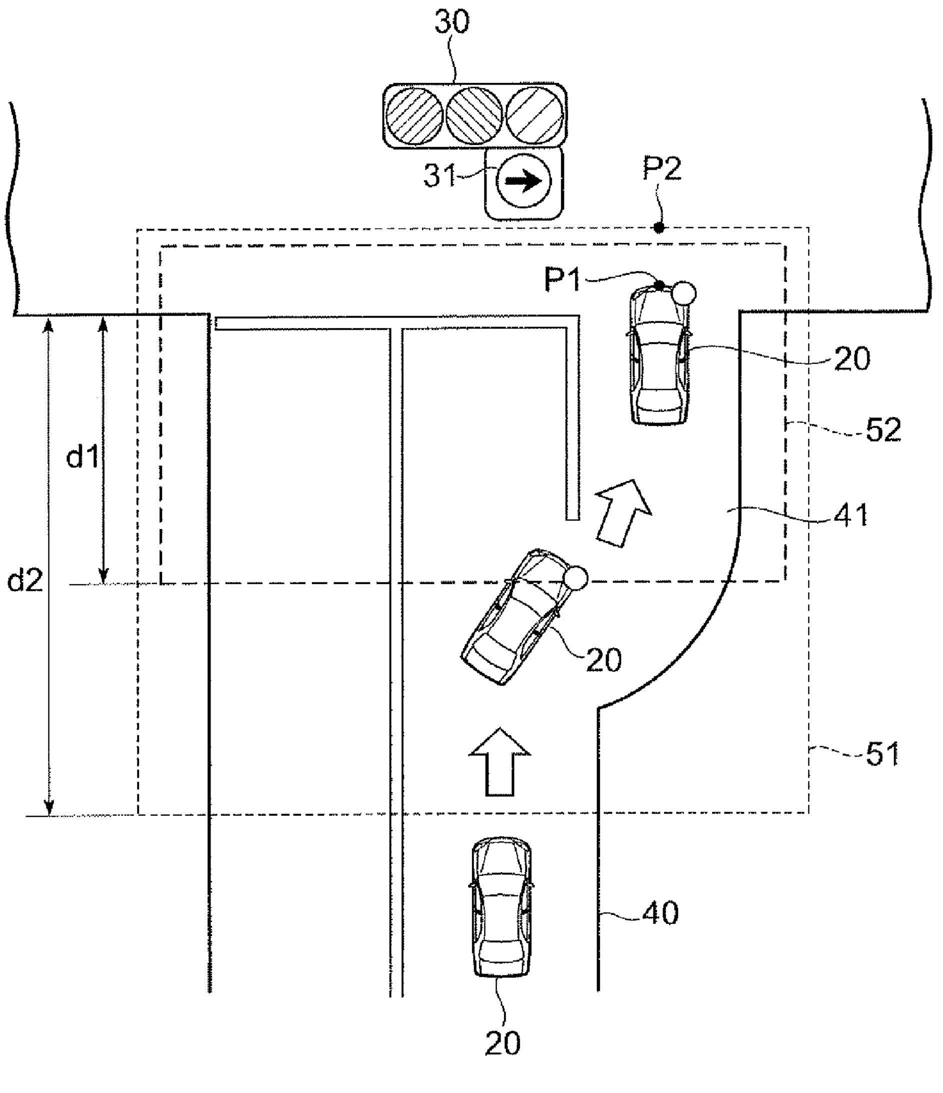
FIG. 2 is a diagram showing a vehicle traveling state when the drive assistance device of FIG. 1 operates.
Figure 3:
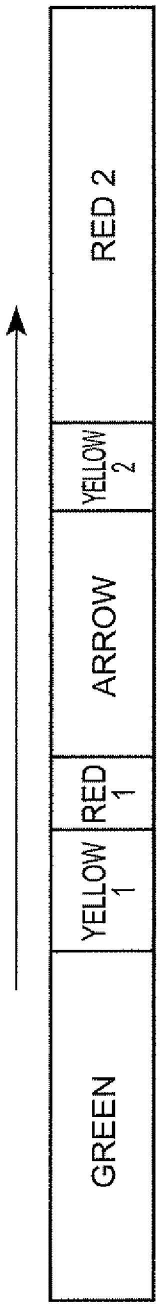
FIG. 3 is a diagram showing an example of a display cycle of a traffic signal.

FIG. 2 is a diagram showing a vehicle travel state when the drive assistance device of this embodiment operates. As shown in FIG. 2, the operation of the drive assistance device will be described for a case where a vehicle 20 is traveling toward an intersection where a traffic signal 30 is installed. The traffic signal 30 includes an arrow lamp device 31 for right-turn. As shown in FIG. 3, the traffic signal 30 performs signal display repeatedly in an order of green display, first yellow display (yellow 1), first red display (red 1), right-turn green display of the arrow lamp device (an arrow, in this case, first red display is performed simultaneously), second yellow display (yellow 2), second red display (red 2), green display, first yellow display, . . . .

When the traffic signal 30 performs second red display, the vehicle approaching the intersection needs to stop traveling, and necessity of stopping the vehicle does not differ regardless of a route from the intersection. In contrast, if first red display and right-turn green display of the arrow lamp device are performed simultaneously, when a vehicle that approaches the intersection goes straight and turns left, the vehicle needs to stop, and when turning right, the vehicle does not need to stop. For this reason, the necessity of stopping the vehicle differs depending on the route from the intersection.

Thus, when the necessity of stopping differs depending on the route of the vehicle, a drive assistance operation for stimulating stopping is suppressed, and the start timing of the drive assistance operation is delayed, so proper drive assistance is possible.

As shown in FIG. 2, a road 40 on which the vehicle 20 is traveling includes a road area 41 for right-turn-only. In front of the intersection, a first behavior detection area 51 and a second behavior detection area 52 are set. The first behavior detection area 51 and the second behavior detection area 52 are areas set by the ECU 10. That is, the ECU 10 sets a road area up to a first distance d1 in front of the intersection as the first behavior detection area 51 and sets a road area up to a second distance d2 in front of the intersection as the first behavior detection area 51. The first distance d1 is set longer than the second distance d2.

The first behavior detection area 51 is an area that is set so as to delay the start timing of the drive assistance operation as compared with normal drive assistance when there is a right/left-turn preparatory behavior, such as a blinker operation or the like, of the vehicle within this area. The second behavior detection area 52 is an area that is set so as to delay the start timing of a drive assistance operation when there is a right/left-turn preparatory behavior, such as a blinker operation or the like, of the vehicle within this area.

The first distance d1 for determining the range of the first behavior detection area 51 may be set to be 30 m in front of the intersection, or may be set to a place where a right/left-turn preparatory behavior, such as a blinker operation, handle steering, or the like, starts. Alternatively, a distance to a predetermined position in front of a place where a right/left-turn exclusive lane is formed may be set, or a distance to the previous intersection from the target intersection based on node information acquired from the infrastructure may be set.

The first distance d1 indicating the range of the first behavior detection area 51 may be set on the basis of a right/left-turn operation by the driver, for example, a drive operation state, such as a blinker operation, a handle operation, a brake operation, or the like.

Figure 4:
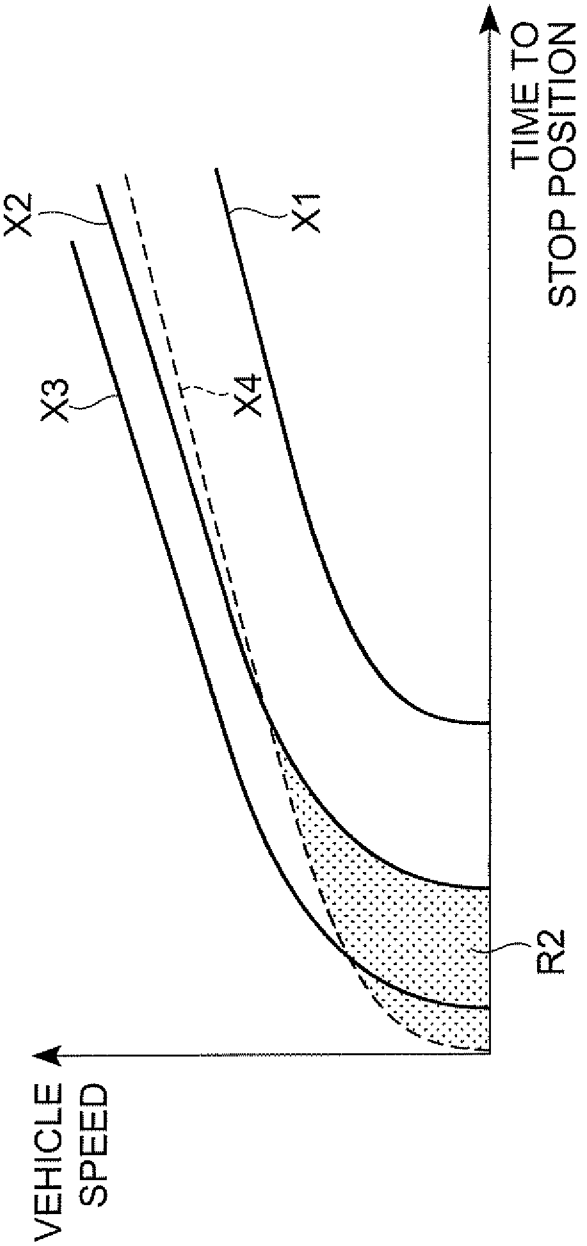
FIG. 4 is an explanatory view of a map for setting the start timing of a drive assistance operation of the drive assistance device of FIG. 1.

FIG. 4 is an explanatory view of a map for setting the start timing of a drive assistance operation in the drive assistance device of this embodiment.

In FIG. 4, the horizontal axis represents a travel time until the vehicle arrives at the stop position of the intersection from the position of the own vehicle, and the vertical axis represents the vehicle speed of the own vehicle. A time required for the vehicle to arrive at the stop position is calculated on the distance to the intersection and the vehicle speed, and the start timing of a drive assistance operation is determined by the map of FIG. 4 in accordance with the time and the vehicle speed.

For example, in the case that the traffic signal performs red display when the vehicle passes through the intersection, a drive assistance operation to give an alarm that red display is performed is performed before the vehicle passes through the intersection. In the case that the traffic signal at the intersection is a normal traffic signal that has no arrow lamp device and performs red display, yellow display, and green display, in FIG. 4, a drive assistance operation starts when the time required for the vehicle to arrive at the stop position and the vehicle speed becomes an alarm curve X1. This is a normal drive assistance operation.

In contrast, in the case that the traffic signal installed at the intersection is equipped with an arrow lamp device and it is estimated that the arrow lamp device will be lit when the vehicle passes through the intersection, the map of FIG. 4 is changed from the alarm curve X1 to an alarm curve X2. This change delays the time of an alarm operation indicating that the traffic signal performs red display or for requesting stopping of the vehicle. An area R2 in FIG. 4 illustrates an area of a drive assistance operation when a drive assistance operation, such as an alarm or the like, is started by the alarm curve X2. In FIG. 4, X4 is an alarm curve for second red display (red 2) of FIG. 3.

If the vehicle tries to travel a route indicated by the arrow lamp device, for example, if the arrow lamp device is lit when the vehicle passes through the intersection and the vehicle is moved to the right-turn exclusive lane, the map of FIG. 4 is changed from the alarm curve X2 to an alarm curve X3. This change delays the time of an alarm operation. The alarm curve X3 is set by moving the curve X2 in parallel by the amount corresponding to the distance from the position P1 of the stop line to the center position P2 of the road (see P1 and P2 of FIG. 2).

Figure 5:
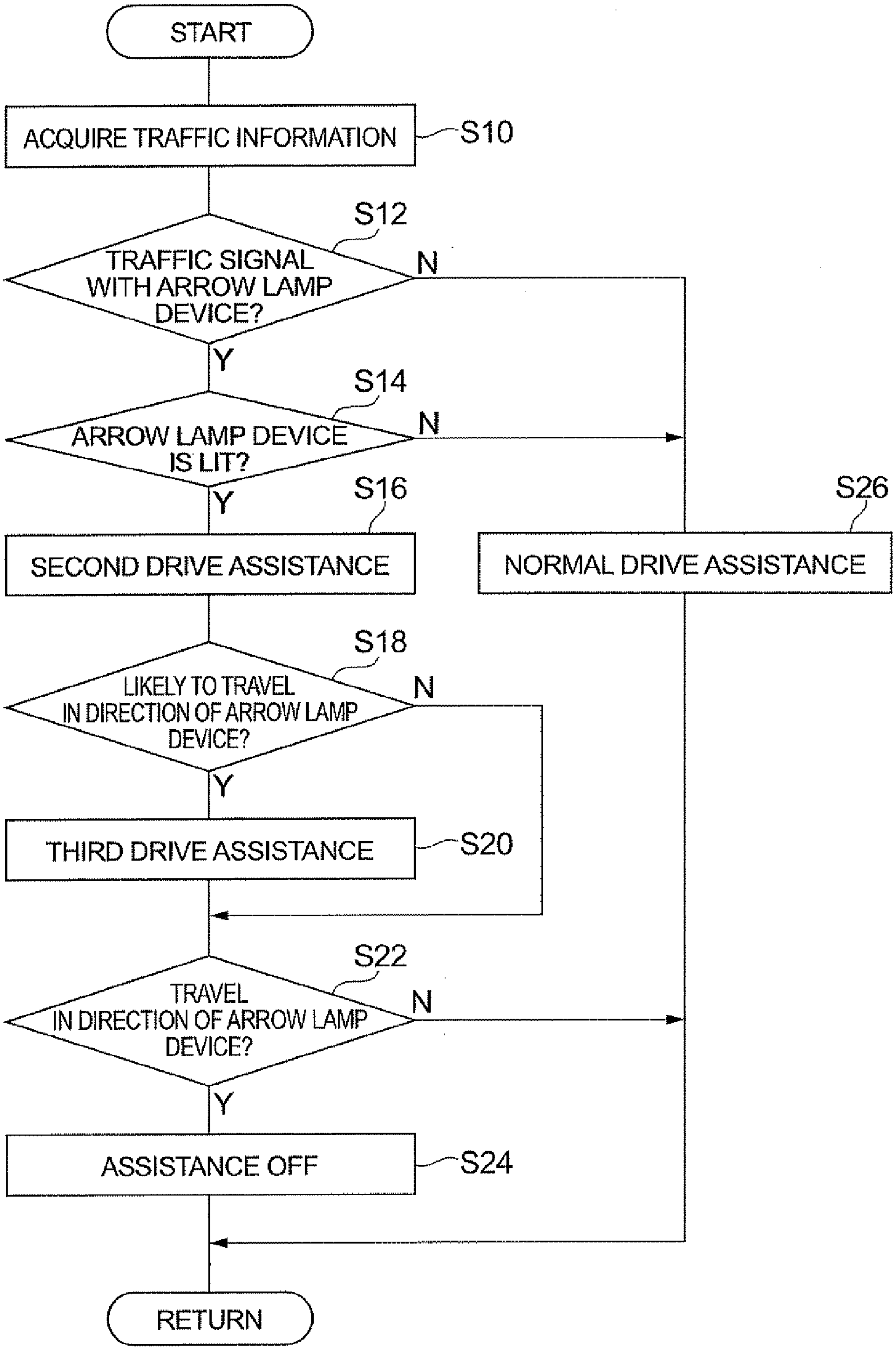
FIG. 5 is a flowchart showing an operation of the drive assistance device of FIG. 1.

FIG. 5 is a flowchart showing the operation of the drive assistance device of this embodiment. Control processing of FIG. 5 starts, for example, at the time of ignition of the vehicle, and executed repeatedly by the ECU 10 in a predetermined cycle.

As shown in S10 of FIG. 5, traffic information acquisition processing is performed. This processing is processing for acquiring traffic information on a road on which the vehicle is traveling, for example, information regarding whether a traffic signal exists in a predetermined range in the vehicle travel direction or not and information regarding whether the traffic signal nearest to the vehicle in the vehicle travel direction is a traffic signal with an arrow lamp device by the communication unit 2. In this case, it is preferable to acquire information regarding the display cycle of the traffic signal nearest to the vehicle.

Next, the process progresses to S12, and it is determined whether or not a traffic signal nearest to the vehicle is a signal with an arrow lamp device. If it is determined in S12 that the traffic signal nearest to the vehicle is not a signal with an arrow lamp device, normal drive assistance processing is performed (S26). This normal drive assistance processing (first drive assistance processing) is processing for starting a drive assistance operation with the normal drive assistance timing. For example, when an alarm is given in accordance with the display state of the traffic signal as a drive assistance operation, the alarm curve X1 is set from the start timing of the drive assistance operation of FIG. 4. Thus, the drive assistance operation starts with normal timing, and for example, if the traffic signal performs red display when the vehicle passes through the traffic signal nearest the vehicle, an alarm is given to the driver with the timing of the alarm curve X1. If the traffic signal performs yellow display when the vehicle passes through the traffic signal nearest to the vehicle, an alarm is given to the driver with the timing of the alarm curve X1 so as to call the driver's attention. If the traffic signal performs green display when the vehicle passes through the traffic signal nearest to the vehicle, no alarm is given to the drive even with the timing of the alarm curve X1.

If it is determined in S12 that the traffic signal nearest to the vehicle is a signal with an arrow lamp device, it is determined whether the arrow lamp device is lit or not when the vehicle passes through the traffic signal (S14). This determination is performed on the basis of the travel position of the vehicle, the vehicle speed, and the display timing of the traffic signal.

If it is determined in S14 that the arrow lamp device is not lit when the vehicle passes through the traffic signal, the process progresses to S26. Meanwhile, if it is determined that the arrow lamp device is lit when the vehicle passes through the traffic signal, second drive assistance processing is performed (S16). This second drive assistance processing is processing in which a drive assistance operation is delayed with respect to the normal drive assistance processing, and is executed with the start timing of drive assistance delayed with respect to the normal drive assistance state, for example. Specifically, the alarm curve X2 is set from the start timing of the drive assistance operation of FIG. 4. Thus, the drive assistance operation starts with the timing later than the normal drive assistance state, and for a vehicle that is traveling to a route indicated by the arrow lamp device, an alarm for requesting the driver to pay attention to the red signal or for stimulating the driver to stop the vehicle is suppressed, so unnecessary drive assistance is prevented from being executed.

Next, the process progresses to S18, and it is determined whether the vehicle is likely to travel on the route indicated by the arrow lamp device or not. For example, if the lane position of the vehicle can be determined, when the vehicle is traveling on the end lane, it is determined that the vehicle is likely to travel on the route indicated by the arrow lamp device. If the lane position of the vehicle can be determined, when the vehicle is traveling on the center lane and intended to turn right/left, it is determined that the vehicle is likely to travel on the route indicated by the arrow lamp device. Meanwhile, if the lane position of the vehicle can be determined, when the vehicle is traveling on the center lane and not intended to turn right/left, it is determined that the vehicle is unlikely to travel on the route indicated by the arrow lamp device.

If the lane position of the vehicle cannot be determined, when it is determined by a blinker operation, a handle steering input, a brake operation, or the like that the vehicle is intended to turn right/left, it is determined that the vehicle is likely to travel on the route indicated by the arrow lamp device. Meanwhile, if the lane position of the vehicle cannot be determined, when there is no blinker operation, handle steering input, brake operation, or the like, and the vehicle is not intended to turn right/left, it is determined that the vehicle is unlikely to travel on the route indicated by the arrow lamp device.

If it is determined in S18 that the vehicle is unlikely to travel on the route indicated by the arrow lamp device, the process progresses to S22. Meanwhile, if it is determined in S18 that the vehicle is likely to travel on the route indicated by the arrow lamp device, third drive assistance processing is performed (S20). The third drive assistance processing is processing in which a drive assistance operation is further delayed with respect to the second drive assistance processing, and is executed with the start timing of drive assistance with respect to the second drive assistance processing, for example. Specifically, the alarm curve X3 is set from the start timing of the drive assistance operation of the FIG. 4. Thus, the drive assistance operation starts with the timing later than when the alarm curve X2 is set. For this reason, when the vehicle travels on the route indicated by the arrow lamp device, an alarm for requesting the driver to pay attention to the red signal or for stimulating the driver to stop the vehicle is suppressed, so unnecessary drive assistance can be reduced.

Next, the process progresses to S22, and it is determined whether the vehicle travels in the direction of the route indicated by the arrow lamp device or not. For example, when the arrow lamp device performs right-turn green display, if the vehicle is on the right-turn exclusive lane, it is determined that the vehicle travels in the direction of the route indicated by the arrow lamp device. Meanwhile, when the arrow lamp device performs right-turn green display, if the vehicle is on a lane other than the right-turn exclusive lane, it is determined that the vehicle does not travel in the direction of the route indicated by the arrow lamp device.

When the arrow lamp device performs right-turn green display, if the vehicle is intended to turn right by a blinker operation or if the vehicle is intended to turn by a handle operation, it is determined that the vehicle travels in the direction of the route indicated by the arrow lamp device. Meanwhile, when the arrow lamp device performs right-turn green display, when there is no blinker operation of the vehicle and the vehicle is not intended to turn right, or there is no handle operation and the vehicle is not intended to turn right, it is determined that the vehicle does not travel in the direction of the route indicated by the arrow lamp device.

If it is determined in S22 that the vehicle does not travel in the direction of the route indicated by the arrow lamp device, a sequence of control processing ends in the third drive assistance state. Meanwhile, if it is determined in S22 that the vehicle travels in the direction of the route indicated by the arrow lamp device, drive assistance is put in an off state (S24). That is, in this case, the vehicle travels in the direction of the route of green display by the arrow lamp device and drive assistance is not required, so no drive assistance operation is performed even with the start timing of drive assistance based on the alarm curve. After the processing of S24 ends, a sequence of control processing ends.

As described above, according to the drive assistance device of this embodiment, when the necessity of stopping the vehicle at the intersection differs depending on the route of the vehicle, the drive assistance operation is suppressed as compared with a case where the necessity of stopping does not differ, so unnecessary drive assistance operations can be reduced.

For example, when an alarm is given to the driver of the vehicle as drive assistance processing when the traffic signal performs red display, if the traffic signal is a signal with an arrow lamp device and if it is estimated that the arrow lamp device is lit when the vehicle passes through the traffic signal, the necessity of stopping the vehicle at the intersection differs depending on the route of the vehicle. In this case, the drive assistance operation is suppressed and the start timing of drive assistance is delayed as compared with a case where the traffic signal performs only red display and the necessity of stopping the vehicle does not differ regardless of the route of the vehicle. Therefore, when the vehicle travels in the direction indicated by the arrow lamp device, unnecessary drive assistance operations can be reduced.

In the drive assistance device of this embodiment, when drive assistance differs depending on the route of the vehicle, the start timing of the drive assistance operation is delayed as compared with a case where the same drive assistance is performed regardless of the route of the vehicle. Therefore, drive assistance can be performed after the driver conducts the vehicle to travel on a predetermined route. As a result, unnecessary drive assistance due to a difference between a specified route and a route intended by the driver can be reduced, so drive assistance corresponding to each route can be performed with high accuracy.

For example, when drive assistance for stopping is performed while the arrow lamp device of the traffic signal is being lit, for a vehicle other than the vehicle traveling in the direction indicated by the arrow lamp device, different drive assistance needs to be performed. Accordingly, a route may be specified on the basis of the traveling lane of the vehicle or presence/absence of right/left-turn behavior, the timing of lane change to the right/left-turn exclusive lane or a blinker operation differs individually. For this reason, many drivers may not conduct such behaviors with the timing of normal drive assistance, so the route may not be specified accurately. In such a state, unnecessary drive assistance corresponding to a route not intended by the drive may be performed, and thus the driver may feel annoyed.

In contrast, when drive assistance differs depending on the route of the vehicle, the start timing of the drive assistance operation is delayed as compared with a case where the same drive assistance is performed regardless of the route of the vehicle. With this configuration, drive assistance can be performed after more drivers conduct the vehicle to travel on a predetermined route, and drive assistance can be performed with high accuracy by reducing unnecessary drive assistance.

In the drive assistance device of this embodiment, the higher the route of the vehicle is likely to be a no-stop-required route, the more the drive assistance operation is suppressed, so an unnecessary drive assistance operation can be properly prevented from being performed.

Figure 6:
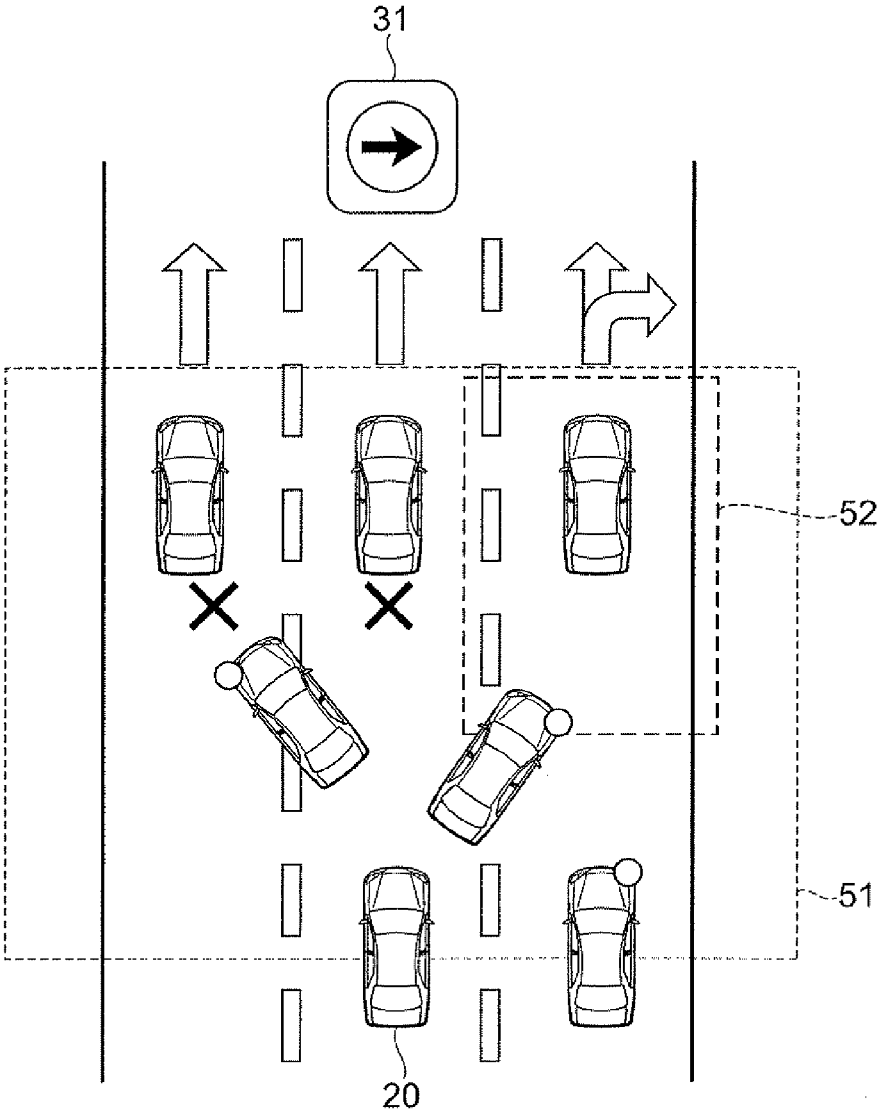
FIG. 6 is an explanatory view of the operation of the drive assistance device of FIG. 1.

Specifically, as shown in FIG. 6, when a traffic signal at an intersection includes an arrow lamp device 31 for right-turn green display, the alarm curve X2 is used for the vehicle 20 that approaches the intersection while the arrow lamp device 31 is being lit, and the drive assistance operation is delayed by one step as the second drive assistance state.

When the right-turn behavior (for example, all behaviors of right blinker operation, handle steering operation, and brake operation) of the vehicle 20 within the first behavior detection area 51 is detected, the second behavior detection area 52 is set and the alarm curve X3 is used, such that the third drive assistance state is reached. In this case, when the vehicle 20 is only changed to a right lane within the first behavior detection area 51, this behavior is not limited to the right-turn behavior depending on the lane position, so setting of the second behavior detection area 52 and setting of the third drive assistance state by the alarm curve X3 are not performed.

When the vehicle 20 has a behavior other than the right-turn behavior within the first behavior detection area 51, the alarm curve X1 or the alarm curve X2 is set. For example, a left-turn behavior (for example, a behavior, such as a left blinker operation or the like) is detected, it is determined that the vehicle is unlikely to turn right, and the alarm curve X1 is set. When a straight behavior is detected, the alarm curve X2 still remains. However, in the second drive assistance state, when the right-turn behavior is detected, drive assistance is put in the off state.

As described above, at the intersection where a traffic signal with an arrow lamp device is installed, when the vehicle approaches the intersection while the arrow lamp device is being lit, the drive assistance operation is performed with the timing later than the normal drive assistance state, and when the vehicle travels in the direction indicated by the arrow lamp device, drive assistance is put in the off state. Therefore, unnecessary drive assistance operations can be reduced, and the driver can be prevented from feeling annoyed by unnecessary drive assistance operations.

The drive assistance device of this embodiment may be applied to arrow lamp devices other than the arrow lamp device which performs only right-turn green display.

Figure 7:
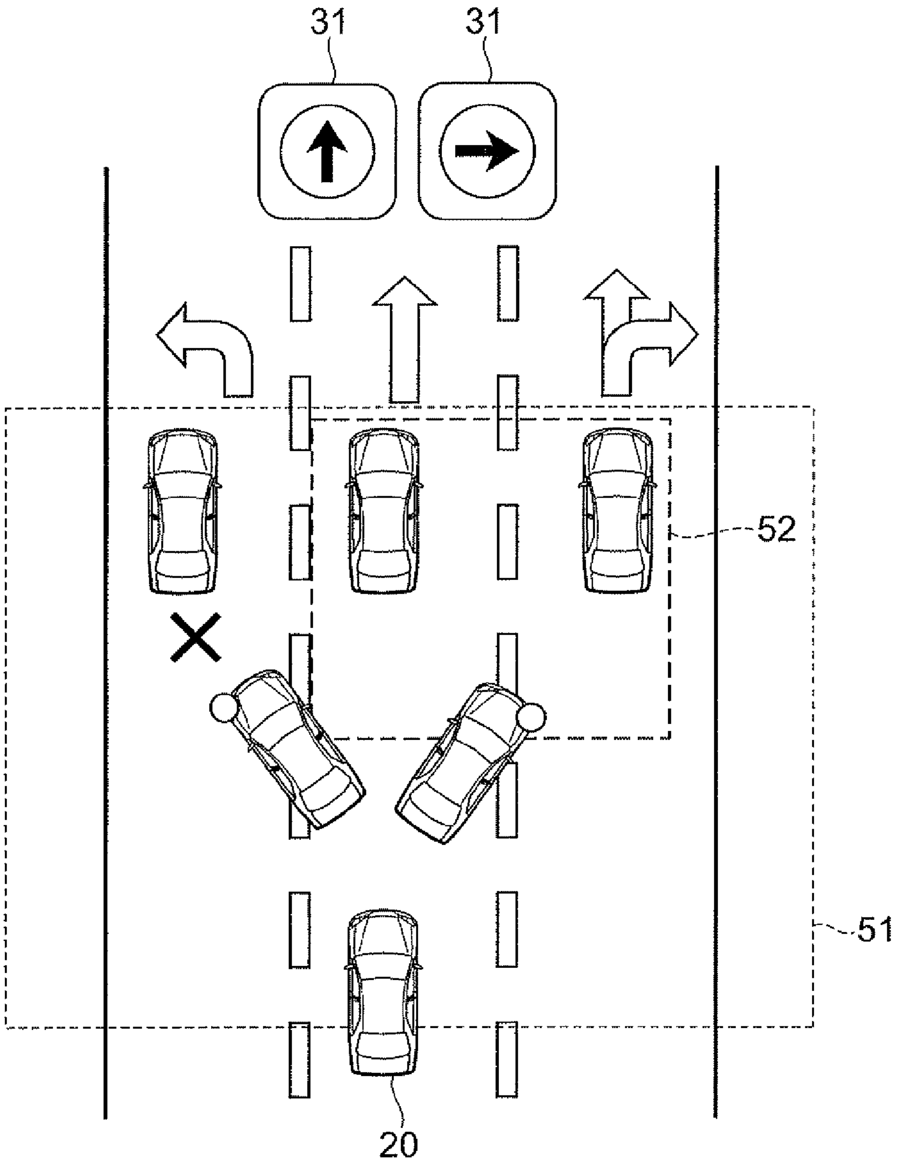
FIG. 7 is an explanatory view of the operation of the drive assistance device of FIG. 1.

For example, as shown in FIG. 7, when a traffic signal at an intersection includes an arrow lamp device 31 for right-turn green display and an arrow lamp device 31 for straight green display, the alarm curve X2 is used for a vehicle 20 that approaches the intersection while each arrow lamp device 31 is being lit, and a drive assistance operation is delayed by one step as the second drive assistance state.

When the right-turn behavior (all behaviors of right blinker operation, handle steering operation, and brake operation) or the straight behavior (for example, no blinker operation and handle operation) of the vehicle 20 within the first behavior detection area 51 is detected, the second behavior detection area 52 is set and the alarm curve X3 is used, such that the third drive assistance state is reached. In this case, when change to a right lane occurs within the first behavior detection area 51, the intersection is limited to right-turn or straight, so the drive assistance state is changed to the third drive assistance state. In the third drive assistance state, when a right-turn behavior is detected, drive assistance is put in the off state.

As described above, even though the arrow lamp device is a device other than the arrow lamp device which performs only right-turn green display, at the intersection where the traffic signal with a arrow lamp device is installed, when the vehicle approaches the intersection while the arrow lamp device is being lit, the drive assistance operation is performed with the timing later than the normal drive assistance state, and drive assistance is put in the off state when the vehicle travels in the direction indicated by the arrow lamp device. Therefore, unnecessary drive assistance operations can be reduced, and the driver can be prevented from feeling annoyed by unnecessary drive assistance operations.

The drive assistance device of this embodiment may be applied to a traffic signal at which one to three arrow lamp devices are installed. In these cases, a drive assistance state is as follows.

When only one arrow lamp device for right-turn green display is installed and the vehicle approaches the intersection while the arrow lamp device is being lit, if the right-turn behavior (for example, a right blinker operation, a right handle operation, and a brake operation) is detected within the first behavior detection area 51, the drive assistance state is changed from the second drive assistance state (a drive assistance state using the alarm curve X2) to the third drive assistance state (a drive assistance state using the alarm curve X3). If a change to a right lane (for example, a right blinker operation and a right handle operation), a left-turn behavior (for example, a left blinker operation, a left handle operation, and a brake operation), or a straight behavior (for example, no blinker operation and handle operation) is detected within the first behavior detection area 51, the second drive assistance state is maintained. If a change to a left lane (for example, a left blinker operation and a left handle operation) is detected within the first behavior detection area 51, the drive assistance state is changed from the second drive assistance state to the normal drive assistance state (a drive assistance state using the alarm curve X1).

When only one arrow lamp device for right-turn green display is installed and the vehicle approaches the intersection while the arrow lamp device is being lit, if the right-turn behavior is detected within the second behavior detection area 52, normal drive assistance is put in the off state. If the left-turn behavior is detected within the second behavior detection area 52, the drive assistance state is changed to the normal drive assistance state. If the straight behavior is detected within the second behavior detection area 52, the second drive assistance state or the third drive assistance state is reached.

When only one arrow lamp device for straight green display is installed and the vehicle approaches the intersection while the arrow lamp device is being lit, if the right-turn behavior, the change to the right lane, the left-turn behavior, or the change to the left lane is detected within the first behavior detection area 51, the second drive assistance state is maintained. When the straight behavior is detected within the first behavior detection area 51, the drive assistance state is changed from the second drive assistance state to the third drive assistance state.

When only one arrow lamp device for straight green display is installed and the vehicle approaches the intersection while the arrow lamp device is being lit, if the right-turn behavior or the left-turn behavior is detected within the second behavior detection area 52, the second drive assistance state or the third drive assistance state is reached. If the straight behavior is detected within the second behavior detection area 52, drive assistance is put in the off state.

When only one arrow lamp device for left-turn green display is installed and the vehicle approaches the intersection while the arrow lamp device is being lit, if the left-turn behavior is detected within the first behavior detection area 51, the drive assistance state is changed from the second drive assistance state to the third drive assistance state. If the change to the left lane, the right-turn behavior, or the straight behavior is detected within the first behavior detection area 51, the second drive assistance state is maintained. If the change to the right lane is detected within the first behavior detection area 51, the drive assistance state is changed from the second drive assistance state to the normal drive assistance state.

When only one arrow lamp device for left-turn green display is installed and the vehicle approaches the intersection while the arrow lamp device is being lit, if the left-turn behavior is detected within the second behavior detection area 52, drive assistance is put in the off state. If the right-turn behavior is detected within the second behavior detection area 52, the drive assistance state is changed to the normal drive assistance state. If the straight behavior is detected within the second behavior detection area 52, the second drive assistance state or the third drive assistance state is reached.

When two arrow lamp devices for right-turn green display and left-turn green display are installed and the vehicle approaches the intersection when each arrow lamp device is being lit, even though one of the right-turn behavior, the change to the right lane, the straight behavior, the left-turn behavior, and the change to the left lane is detected within the first behavior detection area 51, the second drive assistance state is maintained.

When two arrow lamp devices for right-turn green display and left-turn green display are installed and the vehicle approaches the intersection while each arrow lamp device is being lit, if the right-turn behavior or the left-turn behavior is detected within the second behavior detection area 52, drive assistance is put in the off state. If the straight behavior is detected within the second behavior detection area 52, the second drive assistance state is maintained.

When two arrow lamp devices for straight green display and right-turn green display are installed and the vehicle approaches the intersection while each arrow lamp device is being lit, if the straight behavior, the left-turn behavior, or the change to the left lane is detected within the first behavior detection area 51, the second drive assistance state is maintained. If the right-turn behavior or the change to the right lane is detected within the first behavior detection area 51, the drive assistance state is changed from the second drive assistance state to the third drive assistance state.

When two arrow lamp devices for straight green display and right-turn green display are installed and the vehicle approaches the intersection while each arrow lamp device is being lit, if the right-turn behavior or the straight behavior is detected within the second behavior detection area 52, drive assistance is put in the off state. If the left-turn behavior is detected within the second behavior detection area 52, the second drive assistance state or the third drive assistance state is reached.

When two arrow lamp devices for straight green display and left-turn green display are installed and the vehicle approaches the intersection while each arrow lamp device is being lit, if the straight behavior, the right-turn behavior, or the change to the right lane is detected within the first behavior detection area 51, the second drive assistance state is maintained. If the left-turn behavior or the change to the left lane is detected within the first behavior detection area 51, the drive assistance state is changed from the second drive assistance state to the third drive assistance state.

When two arrow lamp devices for straight green display and left-turn green display are installed and the vehicle approaches the intersection while each arrow lamp device is being lit, if the left-turn behavior or the straight behavior is detected within the second behavior detection area 52, drive assistance is put in the off state. If the right-turn behavior is detected within the second behavior detection area 52, the second drive assistance state or the third drive assistance state is reached.

When three arrow lamp devices for straight green display, right-turn green display, and left-turn green display are installed and the vehicle approaches the intersection while each arrow lamp device is being lit, it is determined that a normal green signal display is lit.

As described above, the higher the route of the vehicle is likely to be a no-stop-required route, the more the drive assistance operation is suppressed, so an unnecessary drive assistance operation can be properly prevented from being performed.

It is determined whether the route of the vehicle is likely to be a no-stop-required route or not on the basis of a travel behavior regarding the no-stop-required route, so determination accuracy of whether the route of the vehicle is likely to be a no-stop-required route or not can be increased.

When the drive assistance state is maintained or changed on the basis of the behavior of the vehicle within the first behavior detection area 51 and the second behavior detection area 52, the larger the number of lanes is, the more it is difficult to determine whether the vehicle finally travels on a route at the intersection, so reliability of drive assistance tends to be degraded. To the contrary, when exclusive lanes for straight and right-turn are set in a two-land road, if a right/left-turn behavior is made once, a route from the intersection becomes clear, so reliable information can be given as drive assistance.

It is preferable that the conditions for transition (change) of the drive assistance state and for alarm off (drive assistance off) are changed in accordance with the number of lanes of the road and the presence/absence of the exclusive lane.

Figure 8:
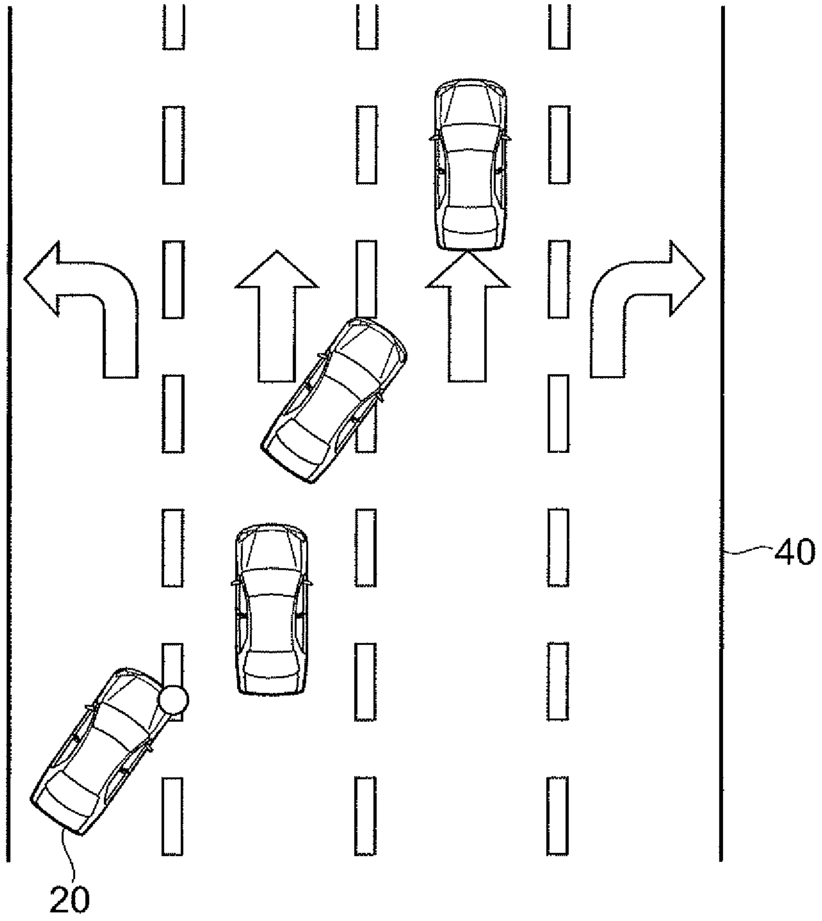
FIG. 8 is an explanatory view of the operation of the drive assistance device of FIG. 1.

For example, as shown in FIG. 8, a right-turn behavior is made twice at an intersection of a four-lane road 40, the vehicle may not finally turn right at the intersection. For this reason, in the case of a three-lane road, it is preferable that, even when a right/left-turn behavior and a lane change are made within the second behavior detection area 52, the drive assistance is not changed to the third drive assistance state, and drive assistance is not put in the off state.

Figure 9:
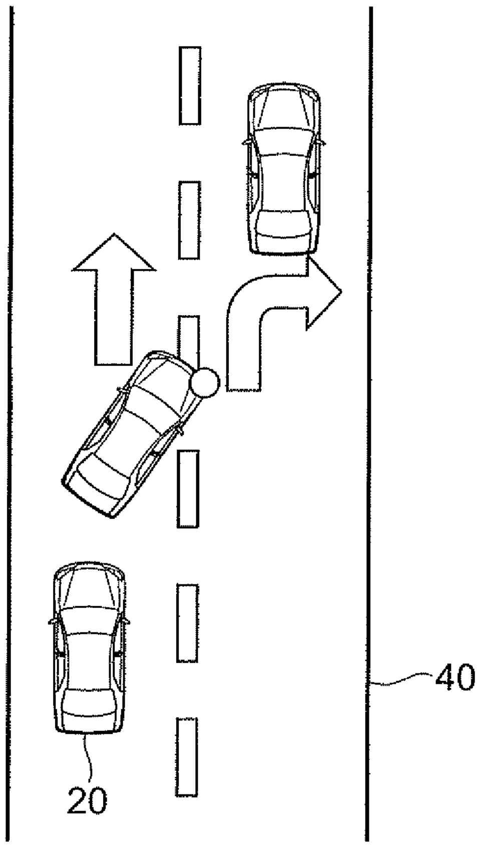
FIG. 9 is an explanatory view of the operation of the drive assistance device of FIG. 1.

As shown in FIG. 9, when one lane of a two-lane road 40 is an exclusive lane, if a right-turn behavior is made once, it can be determined that the vehicle turns right at the intersection. To the contrary, when a left-turn behavior opposite to the route of the arrow lamp device is made, the vehicle is unlikely to turn right, so it can be determined that red signal display is performed when the arrow lamp device is lit and alarm timing can be calculated. As described above, in the case of a road having an exclusive lane, it is preferable that an alarm is turned off when a right/left-turn behavior in the direction of the route indicated by the arrow lamp device corresponds to a value obtained by subtracting the number of exclusive lanes from the number of lanes.

As described above, it is determined whether the route of the vehicle is likely to be a no-stop-required route or not on the basis of the number of lanes of a road on which the vehicle is traveling and presence/absence of an exclusive lane on the no-stop-required route. Therefore, determination accuracy of whether the route of the vehicle is a no-stop-required route or not can be increased.

When it is determined whether to maintain or change the drive assistance state on the basis of the behaviors of the vehicle within the first behavior detection area 51 and the second behavior detection area 52, it is preferable to determine whether the drive assistance state is changed to the third drive assistance state by the right/left-turn behavior or not on the basis of the situation of a preceding vehicle.

For example, when the vehicle changes the lane in a state where there is no preceding vehicle, it can be determined that the lane change is made for right/left-turn at the intersection. To the contrary, when there is a preceding vehicle, the lane change is likely to be made for passing.

Accordingly, when there is a preceding vehicle which is not stopping, if a right/left-turn behavior is made to the route indicated by the arrow lamp device and the vehicle speed increases, it is determined to be a passing behavior, so the drive assistance state is not changed to the third drive assistance state and the second drive assistance state is maintained. Meanwhile, when a right/left-turn behavior is made to the route indicated by the arrow lamp device, and the vehicle speed does not increase, it is determined to be a behavior by right/left-turn at the intersection, and the drive assistance state is changed to the third drive assistance state.

When there is a vehicle which is stopping, even though a right/left-turn behavior is made to the route indicated by the arrow lamp device, the drive assistance state is not changed to the third drive assistance state, and the second drive assistance state is maintained. In this case, it is determined to be a right/left-turn behavior for avoiding the vehicle which is stopping.

As described above, when there is a preceding vehicle in front of a vehicle which is a target for drive assistance, it is determined whether the route of the vehicle is likely to be a no-stop-required route on the basis of a comparison result of the vehicle speed after the travel behavior of the vehicle with the vehicle speed before the travel behavior of the vehicle. Therefore, it is possible to determine whether the travel behavior of the vehicle is a behavior for passing the preceding vehicle or a behavior for going toward the no-stop-required route, so determination accuracy of whether the route of the vehicle is a no-stop-required route or not can be increased.

When it is determined whether to maintain or change the drive assistance state on the basis of the behaviors of the vehicle within the first behavior detection area 51 and the second behavior detection area 52, a brake operation may be set as the condition for detecting the right/left-turn behavior of the vehicle. In this case, when there is a preceding vehicle, the brake operation is likely to be a brake operation for following the preceding vehicle, so it is preferable to set the brake operation condition strictly. For example, when only a brake operation is made with no blinker operation and handle operation, it is not determined to be a right/left-turn behavior. Therefore, proper drive assistance is performed.

When it is determined whether to maintain or change the drive assistance state on the basis of the behaviors of the vehicle within the first behavior detection area 51 and the second behavior detection area 52, a blinker operation may be set as the condition for detecting the right/left-turn behavior of the vehicle. In this case, when the blinker operation is made for a long time equal to or more than a predetermined time, preferably, it is determined that the driver forgets to turn off the blinker, and it is not determined to be a blinker operation. Therefore, proper drive assistance is performed.

Figure 10:
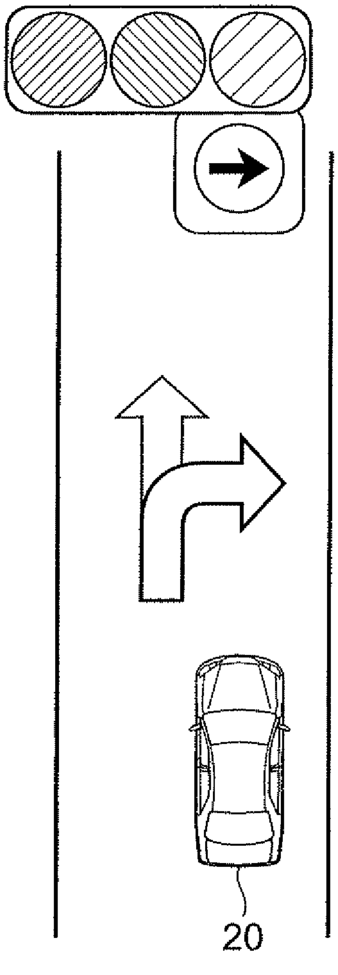
FIG. 10 is an explanatory view of the operation of the drive assistance device of FIG. 1.

When it is determined whether to maintain or change the drive assistance state on the basis of the behaviors of the vehicle within the first behavior detection area 51 and the second behavior detection area 52, as shown in FIG. 10, it may be difficult to detect right/left-turn at the intersection on the basis of the behavior of the vehicle on the single lane. In this case, preferably, when the vehicle is near to any one end by a predetermined amount or more within the lane, it is determined to be a right/left-turn operation; otherwise, it is determined to be a straight operation. In FIG. 10, the vehicle 20 is near to right by a predetermined amount or more, so it should suffice that it is determined to be a right-turn behavior, and the drive assistance state is changed from the second drive assistance state to the third drive assistance state.

Figure 11:
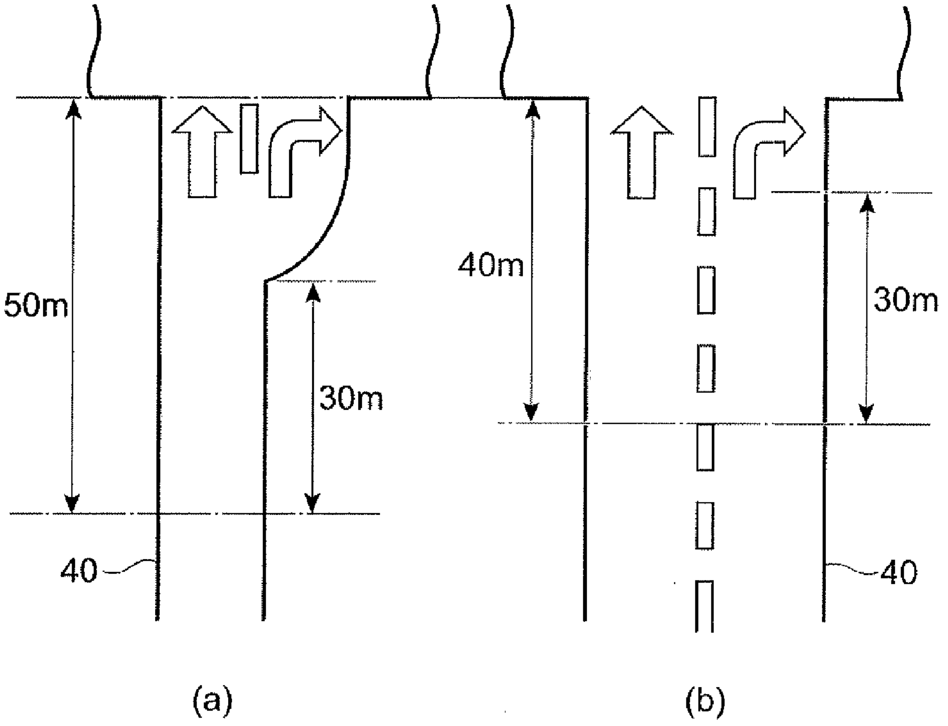
FIG. 11 is an explanatory view of the operation of the drive assistance device of FIG. 1.
Figure 12:
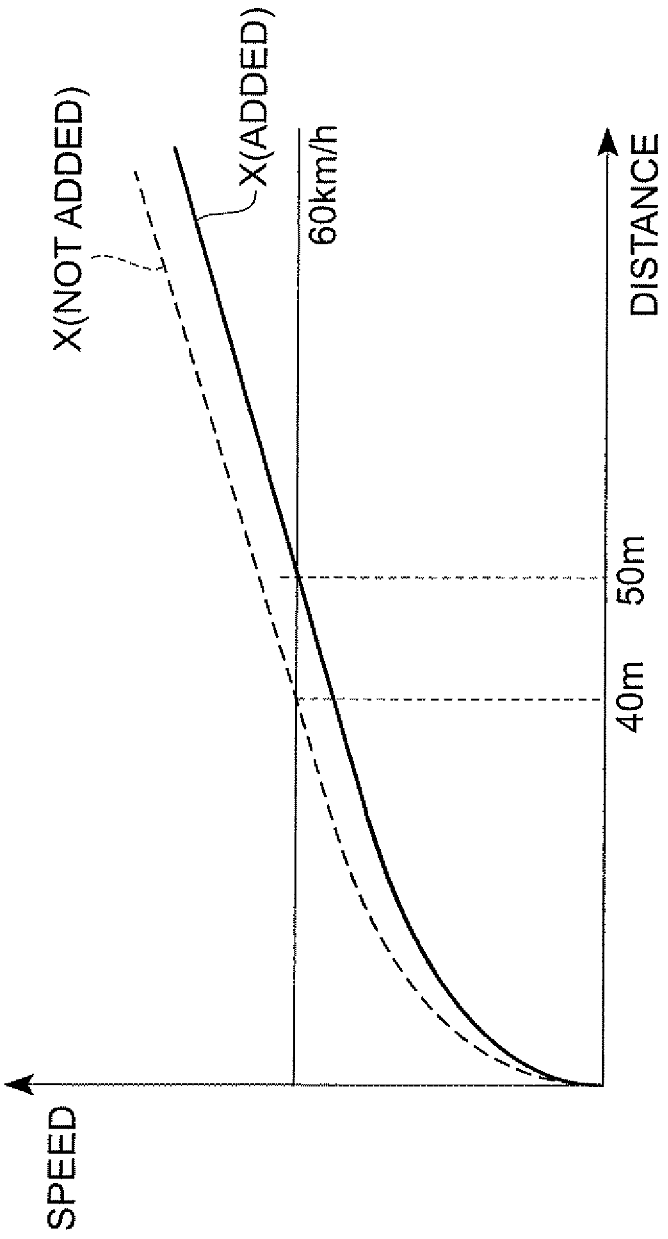
FIG. 12 is an explanatory view of the operation of the drive assistance device of FIG. 1.

When it is determined whether to maintain or change the drive assistance state on the basis of the behaviors of the vehicle within the first behavior detection area 51 and the second behavior detection area 52, it is preferable to change an alarm curve on the basis of the shape of the road. For example, as shown in FIG. 11(*a*), when a right-turn exclusive lane is added in front of an intersection in a road 40, a right-turn behavior of the vehicle appears in front of the point where the right-turn exclusive lane is added. For this reason, it is preferable that, for example, the start point of the first behavior detection area 51 is set at 30 m in front of the point where the right-turn exclusive lane is added, and as shown in FIG. 12, an alarm curve X is set at 50 m in front of the intersection at the average vehicle speed.

In contrast, as shown in FIG. 11(*b*), when no right-turn exclusive lane is added in front of the intersection in the road 40, the right-turn operation of the vehicle by the drive is delayed as compared with the case shown in FIG. 11(*b*). For this reason, it is preferable that the start point of the first behavior detection area 51 is set near the intersection as compared with the case shown in FIG. 11(*b*), for example, at 30 m in front of a solid-line start point (at 40 m in front of the stop line). In this case, an alarm curve X is set such that an alarm or calling for attention is not made up to the start point of the first behavior detection area 51 (see a broken line of FIG. 12). Therefore, an unnecessary drive assistance operation can be suppressed, so bothering of the driver can be reduced.

As described above, when an exclusive lane on a no-stop-required route is added around the intersection, the drive assistance operation is suppressed as compared with a case where no exclusive lane on the no-stop-required route is added. Therefore, it is possible to determine whether the drive assistance operation should be suppressed or not on the basis of whether the vehicle enters the exclusive lane on the no-stop-required route or not, so a proper drive assistance operation can be performed.

The foregoing embodiment is an example of the drive assistance device according to the invention, and the drive assistance device according to the invention is not limited to that described in this embodiment. The drive assistance device according to the embodiment may be modified or applied to others without changing the subject matter of the invention described in the appended claims.

Figure 13:
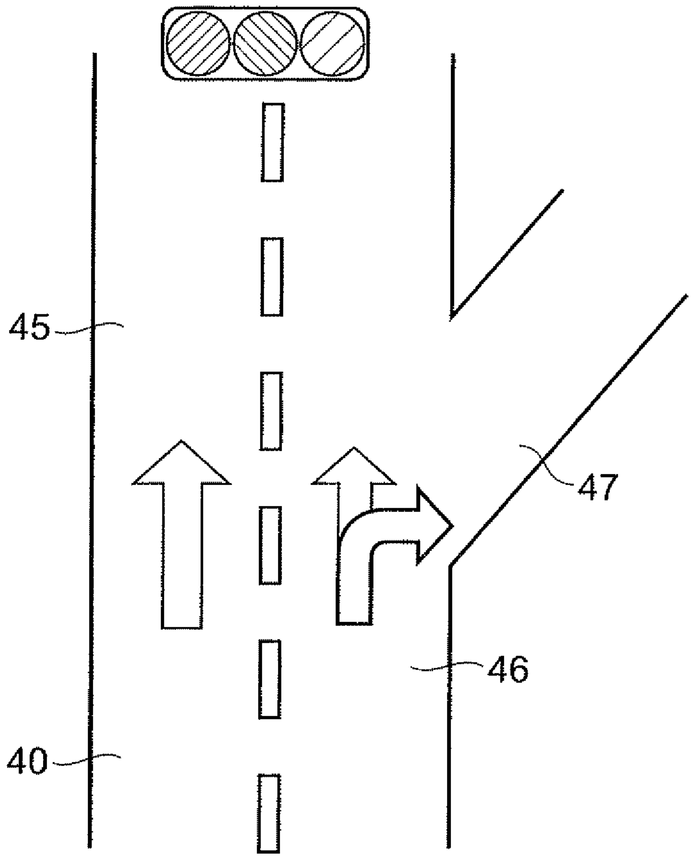
FIG. 13 is an explanatory view of a modification of the drive assistance device of FIG. 1.

For example, although in the foregoing embodiment, the case where the necessity of stopping differs depending on the route of the vehicle refers to the case where the arrow lamp device is installed at the traffic signal at the intersection, other cases may be applied. For example, as shown in FIG. 13, a case where one lane 45 of a two-lane road 40 is a straight exclusive lane and the other lane 46 is a route for straight and exit to a right side road 47 may be applied. That is, in the case that the traffic signal performs red display when the vehicle approaches the intersection where the traffic signal is present, when the vehicle is traveling on the straight exclusive lane 45, the necessity of stopping does not differ, so drive assistance starts with the start timing of normal drive assistance. Meanwhile, when the vehicle is traveling on the lane 46 which is connected to the side road 47, the necessity of stopping differs depending on the route of the vehicle, so drive assistance starts with the timing later than the normal drive assistance operation. Therefore, when the vehicle exits to the side road 47, an unnecessary drive assistance operation can be suppressed, so bothering of the driver can be minimized.

Although in the foregoing embodiment, a case where the start timing of the drive assistance operation is delayed so as to suppress the drive assistance operation has been described, the drive assistance operation may be suppressed by reducing the volume of alarm sound, extending the output cycle of discontinuous alarm sound, reducing the size of alarm display, or darkening alarm display with respect to normal display. Further, the drive assistance operation may be suppressed by giving alarm sound, voice, or the like at the time of normal drive assistance and displaying information regarding the signal display state at the time of suppression.

Although in the foregoing embodiment, the drive assistance device for performing drive assistance relative stopping of the vehicle at the intersection has been described, a drive assistance device may provide information peculiar to a route after the intersection to only a target vehicle on the route. For example, traffic information (traffic jam information, accident information, and the like) after the intersection may be provided to only a target vehicle, and then drive assistance may be performed. According to such a drive assistance device, when drive assistance differs depending on the route of the vehicle, the drive assistance operation is suppressed as compared with a case where the same drive assistance is performed regardless of the route of the vehicle, so an unnecessary drive assistance operation can be minimized.

INDUSTRIAL APPLICABILITY

According to the invention, it is possible to provide a drive assistance device capable of performing proper drive assistance by reducing unnecessary drive assistance operations.

The invention claimed is:

1. A drive assistance device for performing drive assistance of a vehicle at an intersection where there are a plurality of routes that the vehicle could travel, the drive assistance being associated with each of the plurality of routes that the vehicle can take at the intersection, wherein, if drive assistance differs depending on an actual route of the vehicle, a drive assistance operation is temporarily suppressed by delaying a start timing of the drive assistance operation for the same intersection depending on the actual route at the intersection as compared with a start timing in a case where the same drive assistance is performed regardless of the actual route of the vehicle, and the suppressed drive assistance operation is performed at the intersection after the delay.

2. The drive assistance device according to claim 1, wherein, when the necessity of stopping the vehicle differs depending on the actual route of the vehicle, the drive assistance operation is suppressed as compared with a case where the necessity of stopping the vehicle does not differ.

3. The drive assistance device according to claim 2, wherein, when the necessity of stopping differs depending on the actual route of the vehicle, the start timing of the drive assistance operation is delayed as compared with a case where the necessity of stopping does not differ.

4. The drive assistance device according to claim 2, wherein the higher the likelihood that the actual route of the vehicle is a no-stop-required route, the more the drive assistance operation is suppressed.

5. The drive assistance device according to claim 4, wherein it is determined whether the actual route of the vehicle is likely to be a no-stop-required route on the basis of a travel behavior regarding the no-stop-required route.

6. The drive assistance device according to claim 4, wherein it is determined whether the actual route of the vehicle is likely to be the no-stop-required route on the basis of the number of lanes of a road on which the vehicle is traveling and presence/absence of an exclusive lane on the no-stop-required route.

7. The drive assistance device according to claim 5, wherein, when a preceding vehicle is present in front of the vehicle, it is determined whether the actual route of the vehicle is likely to be the no-stop-required route on the basis of a comparison result of a vehicle speed after a travel behavior of the vehicle with a vehicle speed before the travel behavior of the vehicle.

8. The drive assistance device according to claim 2, wherein, when an exclusive lane on a no-stop-required route at the intersection is added around the intersection, the drive assistance operation is suppressed as compared with a case where no exclusive lane on the no-stop-required route is added.

9. The drive assistance device according to claim 1, wherein the drive assistance operation is suppressed when the actual route of the vehicle at the intersection corresponds to a predetermined route of the vehicle to take at the intersection, the predetermined route being one of the plurality of routes.

10. The drive assistance device according to claim 1, wherein the drive assistance operation is suppressed based on predetermined vehicle behaviors relating to the actual route of the vehicle at the intersection.

11. The drive assistance device according to claim 1, wherein the drive assistance device is configured to perform drive assistance based on at least one type of lamp device, at least one type of lamp device corresponding to a route that the vehicle may take at the intersection.

* * * * *